Figure 5:
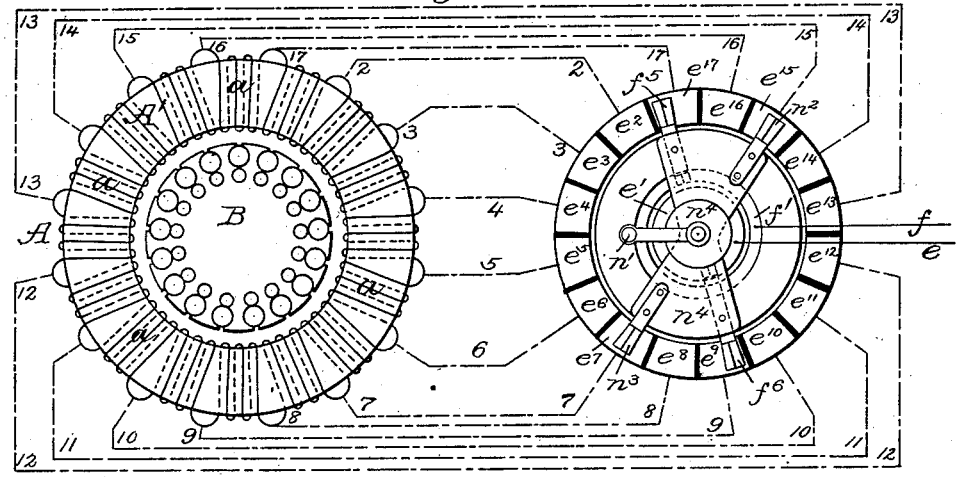

No. 730,891. PATENTED JUNE 16, 1903.
R. EICKEMEYER, DEC'D.
R. EICKEMEYER, JR. C. EICKEMEYER & M. T. EICKEMEYER, EXECUTORS.
MEANS FOR OPERATING ALTERNATING CURRENT ELECTRIC MOTORS.
APPLICATION FILED JULY 6, 1894.
NO MODEL. 7 SHEETS—SHEET 1.
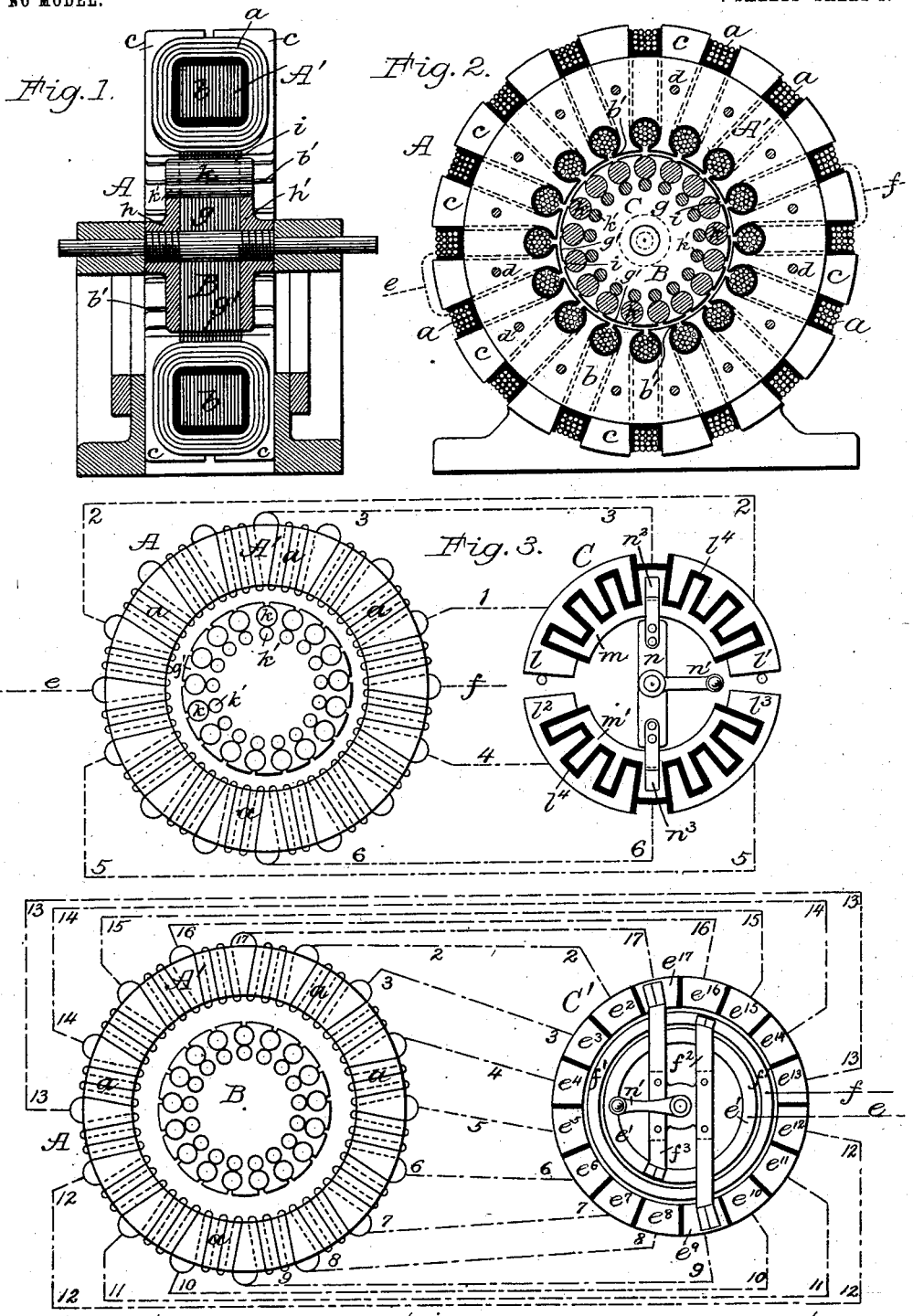

No. 730,891. PATENTED JUNE 16, 1903.
R. EICKEMEYER, DEC'D.
R. EICKEMEYER, JR., O. EICKEMEYER & M. T. EICKEMEYER, EXECUTORS.
MEANS FOR OPERATING ALTERNATING CURRENT ELECTRIC MOTORS.
APPLICATION FILED JULY 6, 1894.
NO MODEL. 7 SHEETS—SHEET 2.

Attest:
Howell Earle
Emma E. Marks

Inventor:
Rudolf Eickemeyer.
By M. B. Wood
Attorney

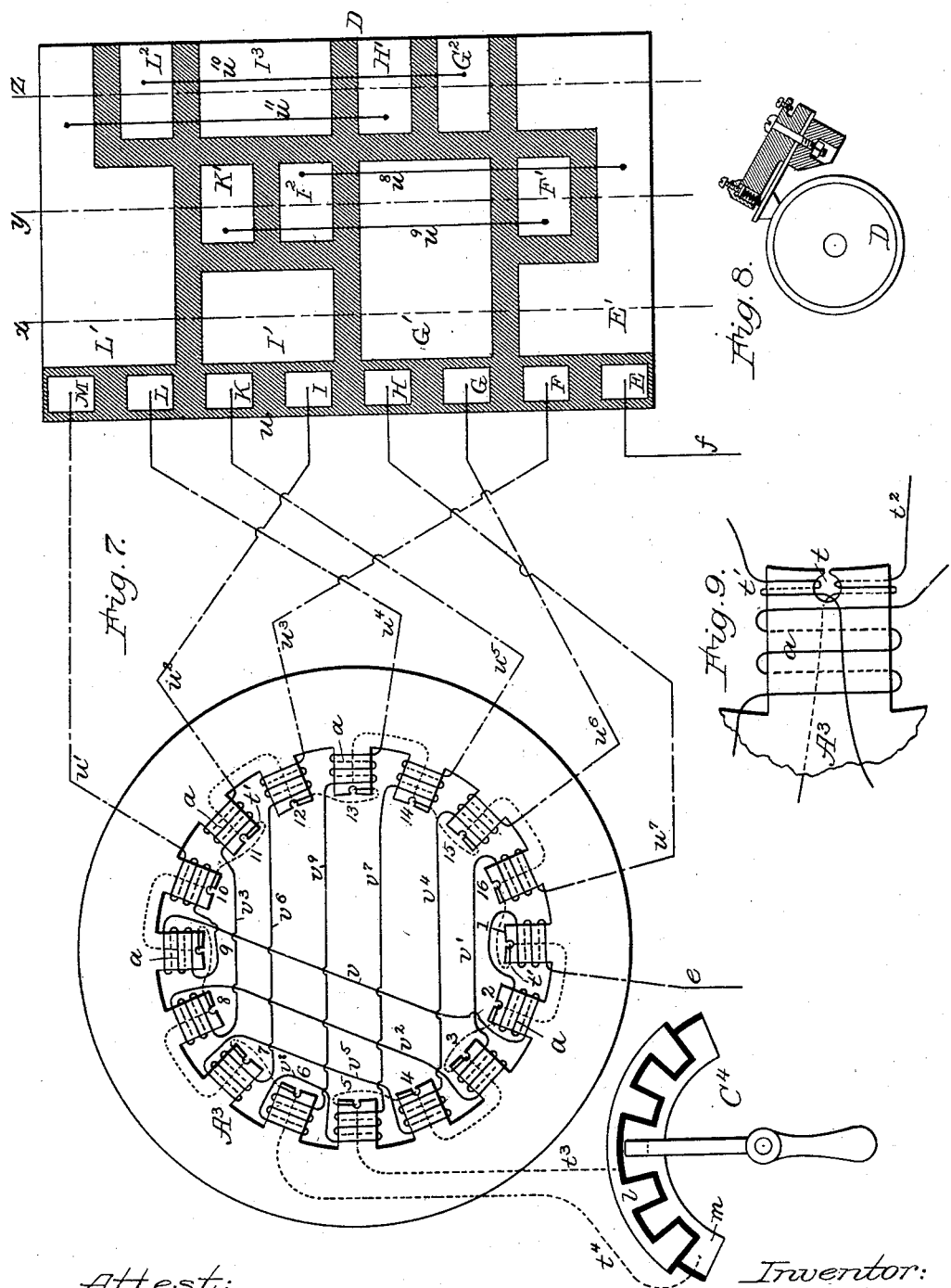

No. 730,891. PATENTED JUNE 16, 1903.
R. EICKEMEYER, DEC'D.
R. EICKEMEYER, JR., O. EICKEMEYER & M. T. EICKEMEYER, EXECUTORS.
MEANS FOR OPERATING ALTERNATING CURRENT ELECTRIC MOTORS.
APPLICATION FILED JULY 6, 1894.
NO MODEL. 7 SHEETS—SHEET 4.
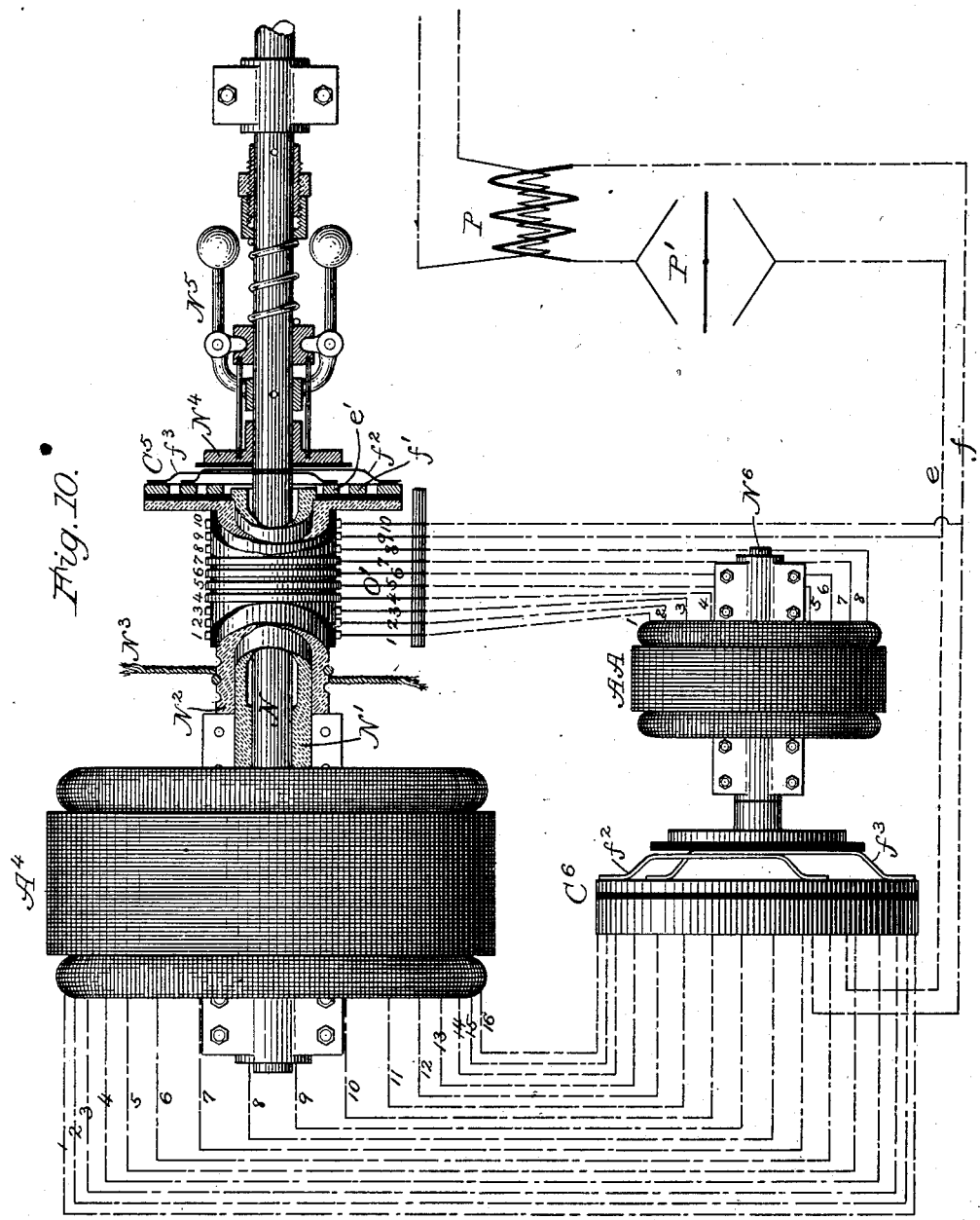

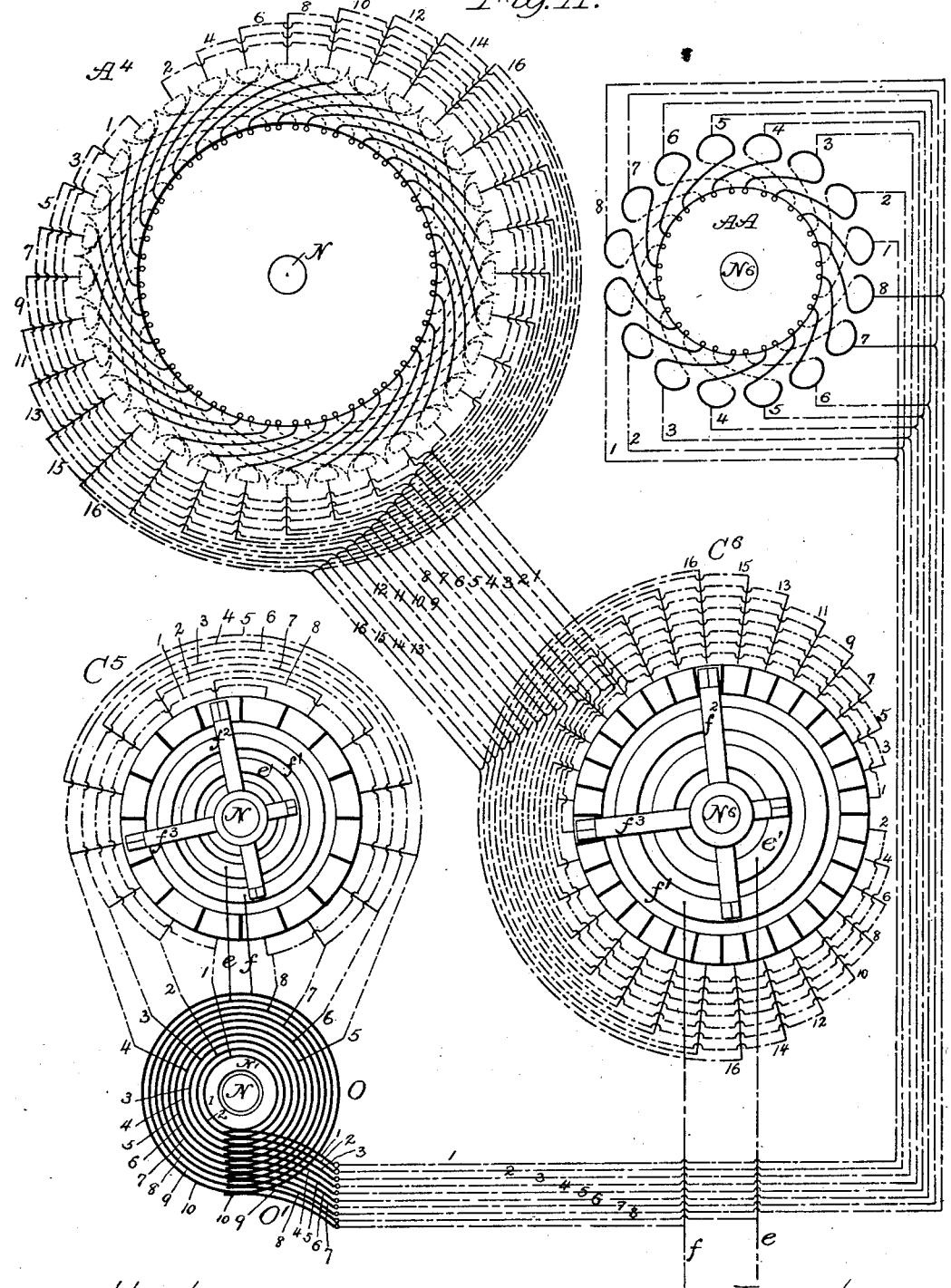

No. 730,891. PATENTED JUNE 16, 1903.
R. EICKEMEYER, DEC'D.
R. EICKEMEYER, JR., C. EICKEMEYER & M. T. EICKEMEYER, EXECUTORS.
MEANS FOR OPERATING ALTERNATING CURRENT ELECTRIC MOTORS.
APPLICATION FILED JULY 6, 1894.
NO MODEL. 7 SHEETS—SHEET 6.
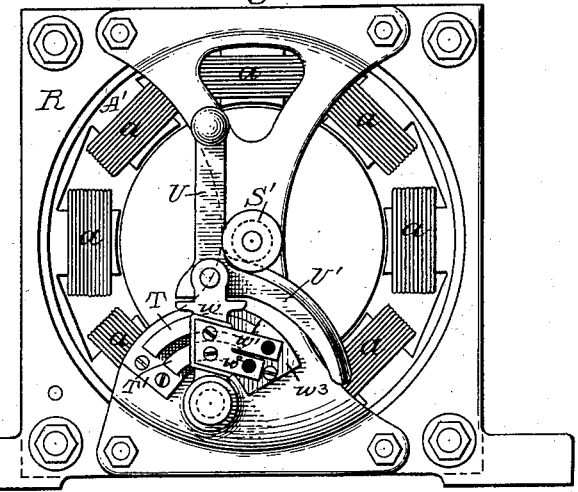
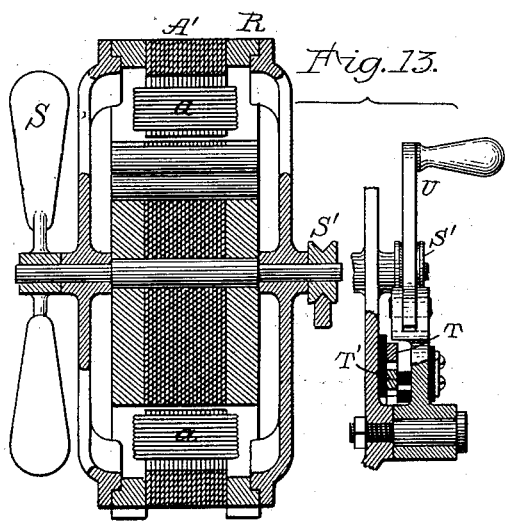
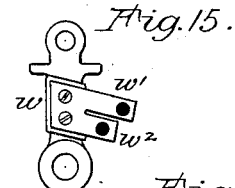
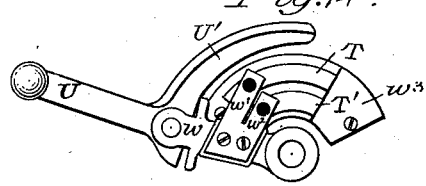
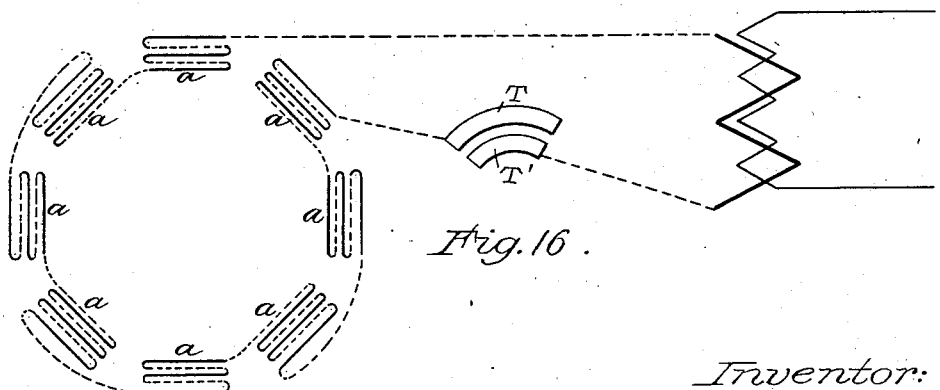

No. 730,891. PATENTED JUNE 16, 1903.
R. EICKEMEYER, DEC'D.
R. EICKEMEYER, JR., O. EICKEMEYER & M. T. EICKEMEYER, EXECUTORS.
MEANS FOR OPERATING ALTERNATING CURRENT ELECTRIC MOTORS.
APPLICATION FILED JULY 6, 1894.
NO MODEL. 7 SHEETS—SHEET 7.

Attest:
Howell Bartle
Emma E. Markt

Inventor:
Rudolf Eickemeyer
By
Attorney

No. 730,891.

Patented June 16, 1903.

UNITED STATES PATENT OFFICE.

RUDOLF EICKEMEYER, OF YONKERS, NEW YORK; RUDOLF EICKEMEYER, JR., CARL EICKEMEYER, AND MARY T. EICKEMEYER EXECUTORS OF SAID RUDOLF EICKEMEYER, DECEASED.

MEANS FOR OPERATING ALTERNATING-CURRENT ELECTRIC MOTORS.

SPECIFICATION forming part of Letters Patent No. 730,891, dated June 16, 1903.

Application filed July 6, 1894. Serial No. 516,724. (No model.)

*To all whom it may concern:*

Be it known that I, RUDOLF EICKEMEYER, of Yonkers, in the county of Westchester and State of New York, have invented certain new and useful Improvements in Means for Operating Alternating-Current Electric Motors; and I do hereby declare that the following specification, taken in connection with the drawings furnished and forming a part of the same, is a clear, true, and complete description of my invention.

My present improvements relate to motors adapted to use in electric circuits wherein the current alternates.

In my application for patent filed September 23, 1891, Serial No. 406,574, I disclosed motors which were driven by currents of the character referred to, the current in each instance operating in a set of field-coils and inducing a secondary current in a separate set of short-circuited field-coils, the latter being unsymmetrically located with relation to the coils to which the main exciting-current is supplied. In some of my said motors the armature-circuits were directly supplied with current and in others the armature-circuits were closed upon themselves and supplied solely by currents induced therein by the alternating field magnetism.

I have now discovered that the alternating current can be made to initially operate motors having induction-armatures in which only closed circuits are employed and to which no outside currents are supplied, by varying the flow of the current in all or in portions of the field-coils by means of an appropriate electric starting-switch, and thereby the armature caused to commence its rotation and with sufficient torque to overcome such load as the motor may be intended to carry.

The armatures of my motors embody iron cores with tightly-inserted longitudinal copper conductors and copper heads and are novel in that said parts are so organized and united by soldering as to constitute a substantially integral solid structure and afford the desired number of closed circuits which are traversed by currents induced by the rotation of the armature through and by the alternations of the magnetic field. In my armatures of this type in their best form the longitudinal conductors are annularly arranged and in one or more concentric rows, so disposed in the iron core as to separate parts of it into sections divided substantially on radial lines extending from the periphery inwardly, also in having the field-poles and the longitudinal conductors unsymmetrical with relation to each other, so that no two magnet-poles can ever have a magnetic circuit (through portions of the core) which is precisely the same as that of any other two poles, and also in having the plugs (or longitudinal conductors) and poles located unsymmetrically, so that no two adjacent plugs will occupy the same position with relation to their adjacent pole or poles as any other two similar adjacent plugs will occupy with relation to their adjacent pole or poles, the object being by these several features of construction to reduce the magnetic resistance of the armature to the lowest practicable degree, and for affording specially ample magnetic circuits and numerous closed circuits in the armature-core I arrange the plugs in concentric rows, so that the plugs in some of the rows will occupy different radial lines from those occupied by the other plugs.

After describing my invention in connection with the several embodiments thereof illustrated in the drawings the features deemed novel and considered appropriate to or within the scope of this application will be duly specified in the several clauses of claim hereunto annexed.

Figure 6:
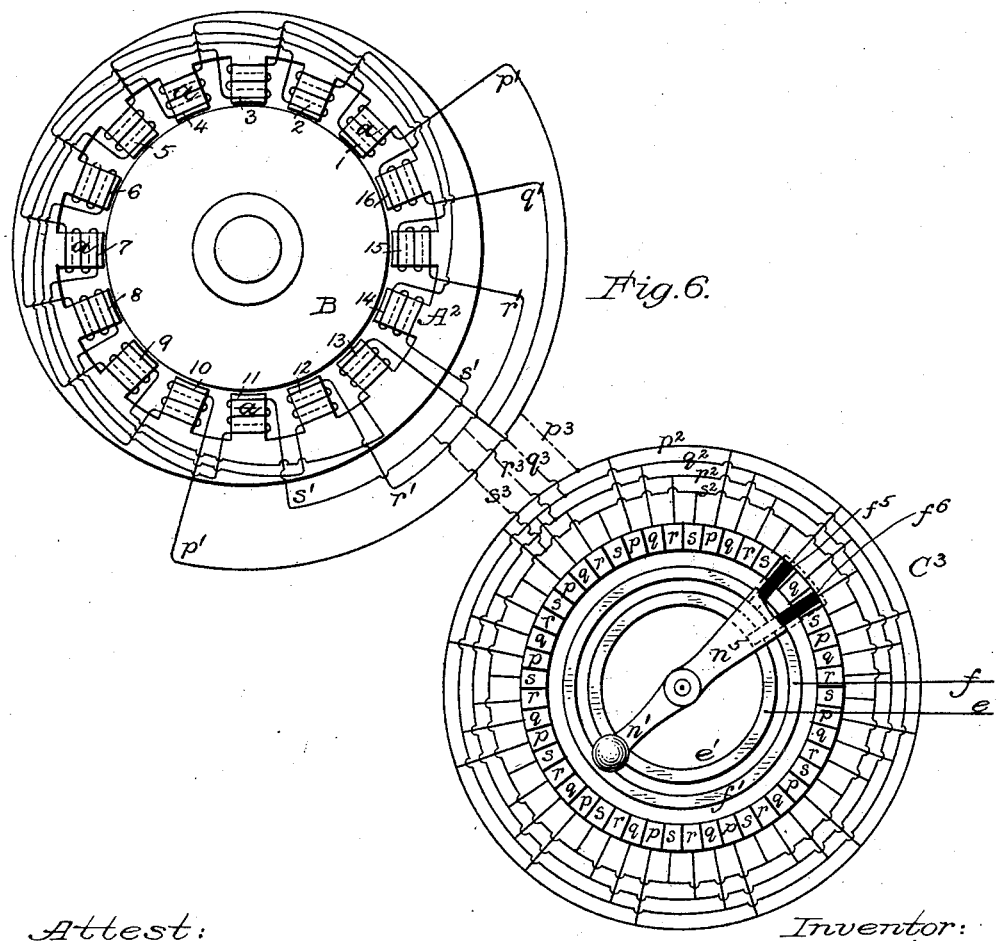
Figure 17:
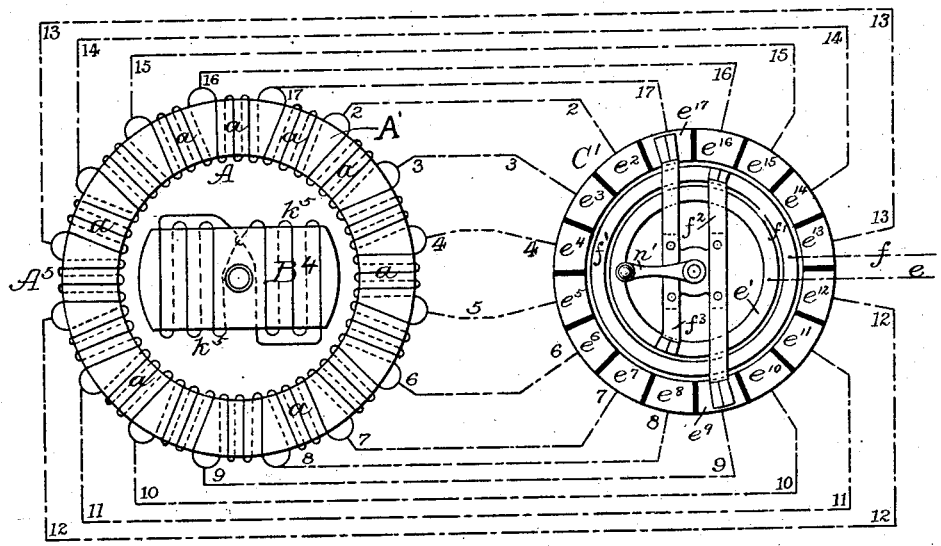
Figure 18:
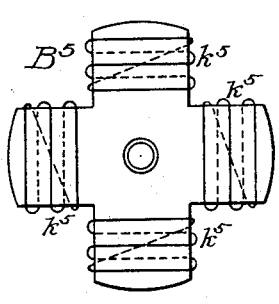
Figure 19:
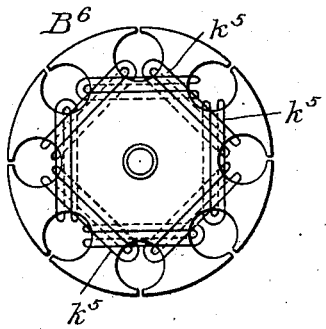

Referring to the drawings, Figures 1 and 2 illustrate in two diametrically opposite sections an alternating-current machine embodying certain portions of my invention. Fig. 3 is a plan view of one of my reversible motor-starting switches and its electrical connections with motor, the latter being bipolar, as in Figs. 1 and 2, but with its field illustrated diagrammatically, and the supply-wire terminals having no connection with the switch. Fig. 4 is a plan view of another of my motor-starting switches and of the motor, as in Fig. 3, but with the supply-wire terminals connected to the switch. Fig. 5 in a similar manner illustrates the motor and still another of my motor-starting switches, this latter embodying the characteristic features of both of the switches Figs. 3 and 4. Fig. 6 illustrates in plan view one of my reversible motor-starting switches and its connection with a multipolar (four-pole) motor. Fig. 7 illustrates one of my motor-starting switches and its connection with special motor-starting coils in a motor-field containing sixteen pole-faces and a pole-governing switch shown in plane projection, by means of which the motor can at any and all times be changed at will or by a mechanical governor from a four to an eight or to a sixteen pole machine. Fig. 8 is an end view of the pole-governing switch. Fig. 9, upon an enlarged scale, illustrates one of the pole-faces of the motor with its exciting-coil and its two special starting-coils as arranged in a reversible motor. Fig. 10 illustrates an electric-elevator organization embodying a power-motor of the type before illustrated, a hand starting-switch to be actuated at or from the elevator-car, a mechanical governor for controlling the hand starting-switch and power starting-switch and its motor, the latter controlling the movement of the power-motor while being itself controlled by the hand starting-switch and the mechanical governor. Fig. 11 diagrammatically illustrates the entire electric and electromagnetic portions of the organization, Fig. 10. Fig. 12 in side view illustrates one of my motors provided with a mechanical starting device combined with a circuit-switch and organized as a fan-motor. Fig. 13 is a vertical section of the same on the line of the armature-shaft and includes a separate illustration of a "mechanical starter." Fig. 14 is a side view of the combined mechanical starter and switch. Fig. 15 is a side view of the switch-arm and its brushes. Fig. 16 diagrammatically illustrates the field-coils and their connections with the switch-terminal plates and a transformer. Fig. 17 diagrammatically illustrates the switch, Fig. 4, and a bipolar-shuttle armature having a closed-circuit winding. Fig. 18 illustrates a four-pole closed-circuit armature. Fig. 19 illustrated another form of closed-circuit multipolar armature.

The machine A (shown in Figs. 1 and 2) has a field-magnet A′, which contains sixteen field-coils $a$ on a ring or core composed of soft-iron plates $b$, the latter being laterally bored to receive the inner ends of the coils, which are otherwise maintained in position by wedge-shaped blocks $c$, interposed between the coils at their sides and outer ends, the blocks and core-plates being clamped together by means of pins or bolts $d$. The bored holes in the core are slitted through to the armature-space, as at $b'$, for affording air-space between the pole-divisions or pole-faces of the field-magnets, of which there are sixteen intervening between the sixteen coils. In this machine as operated in accordance with my invention the main circuit or supply connections are made with the set of field-coils at two opposite points, (indicated at $e$ and $f$,) and the armature B when once started is effectively driven by this bipolar field without any variations in the application of the main current or in the field-coils, although for starting the motor a system of short-circuiting the field-coils or rotation of the field-coil terminals is employed, as will be hereinafter more fully explained.

The armature B contains certain novel features in its construction by which highly-effective closed electric circuits are afforded, and when considered with reference to its combination with the field described valuable novelty is involved in the fact that the number of closed circuits in the armature is a number which has no numerical relation to the number of field-poles or pole-faces, or, in other words, the sixteen field-coils and pole-faces are here used in combination with an armature provided with seventeen conductors. It is to be understood that this portion of my invention extends to any given number of pole-faces in the field and any given number of conductors at the periphery of the armature so long as said number of conductors is indivisible by the number of field-poles or has no large common divisor therewith.

The armature B includes a core $g$ of soft-iron disks clamped between two copper heads $h\ h'$. Near the periphery of the drum thus formed it is bored in the line of its axis at seventeen equidistant points, and the metal is also slitted, as at $i$, through the outer side of each hole, thus dividing the face of the armature into seventeen divisions with intervening air-spaces. Into these holes soft-copper plugs $k$ are tightly inserted. Concentric with these outer holes a corresponding number of smaller holes are bored, each slightly opening into the adjacent large hole. Into these small holes soft-copper plugs $k'$ or pins are fitted, each pair of small and large plugs being in contact with each other and serving in substance as one conductor of such a form as will possess desirable sectional area without unduly reducing the bulk of iron between each pair of the thus connected conductors, this iron being required for affording magnetic circuits. The copper heads $h\ h'$ and the several plugs or pins $k\ k'$ are then united by solder at all the joints, thus producing an armature which is a practically solid integral structure and one which cannot become injured or impaired by service, and hence need never be dismantled.

Referring to Fig. 2, it will be seen that the magnetic circuit from no one field-pole through the adjacent iron in the armature-core to any other field-pole can ever be precisely the same (in magnetic conductivity) as any other magnetic circuit between any other two field-poles, because of the unsymmetrical relations between said field-poles and the divisions of the iron core near its periphery.

I have stated that a motor of this type will be driven efficiently after it has been once started, and although mechanically-operated "starters" can be readily employed with small light motors, as will be hereinafter described, I have devised methods and means by which they may be started electrically, but by the manipulation of what I will call a "terminal-rotating" or "motor-starting" switch, which I have devised in different forms, in the operation of some of which the feeding-current connections with the field remain unchanged, but the field-poles are in substance rotated, because of an intermitting short-circuiting of appropriate portions of the field-coils, whereby the flow of magnetism in the magnetic circuits of the field is so shifted, changed, or varied as to cause the initial and powerful rotation of the armature. A motor-starting switch of this kind is shown in Fig. 3 at C, the motor-field A' with its sixteen coils $a$ being in closed electric circuit and having the feeding-wire terminals $e$ and $f$ at two opposite points. In this switch C there are six annularly-arranged segmental contact blocks or plates; but these are united in opposite groups of three plates each, $l$, $m$, and $l'$ and $l^2$, $m'$, and $l^3$, the plates of each group being in one plane and toothed somewhat like the teeth of an internal gear and an ordinary gear meshed together, but separated at all points by a line of insulating material $l^4$. A brush-arm $n$, centrally pivoted and provided with a hand-crank $n'$, has at each end a brush or contact plate $n^2$ or $n^3$, each being a little wider than the zigzag line $l^4$, of insulating matter, so that as the switch-arm is moved to and fro each brush intermittingly laps upon the two underlying plates and then on only one of them, but alternating in this complete contact with the several plates, the object being to intermittingly short-circuit portions of the field-coils, and to thereby in substance so rotate the field-poles or at least to so shift, change, or vary the flow of magnetism in the field magnetic circuits as to cause the armature to start its rotation in a direction according to the direction in which the switch-arm $n$ is moved, as will be hereinafter specially described.

The connection of the switch-blocks or plates with the field-coils is as follows: The plate $l$ by wire 1 is coupled to the field-coils near the one side of the supply-terminal $f$. The plate $l'$ is coupled by wire 2 with the coil-sections at the upper side of the supply-terminal $e$, and the plate $m$ is coupled by wire 3 with the coil-sections at a point midway of the connections made at the coil by wires 1 and 2 from the plates $l$ and $l'$. The plate $l^2$ is coupled to the coil near and at the opposite side of the terminal $f$ by wire 4. Plate $l^3$ is coupled by wire 5 to the coils near and at the side of the terminal $e$. The plate $m'$ is coupled by wire 6 to the coils at a point located equally between the connections with plates $l^2$ and $l^3$ by their wires 4 and 5. It will now be seen if the switch-bar $n$ should be quickly swung from the position of rest shown, so that its brushes or contacts would pass over plates $m$ and $l'$ and $m'$ and $l^2$, that the sections of field-coil between the connection with wires 2 and 3 and also those sections between wires 4 and 6 will be rapidly and intermittingly short-circuited, and as there are seven insulated lines $l^4$ to bridge these sections of coil are short-circuited and restored to circuit seven times. This will cause the armature to start and be revolved in one direction. If the motor is to be started and driven in the opposite direction, the brushes being in the position shown in the figure, the brush-arm is swung so as to sweep over plates $m$ and $l$ on one side and plates $m'$ and $l^3$ on the other, in which case the coil-section between the connections with wires 1 and 3 will be intermittingly short-circuited on one side and also the sections between the connections with wires 6 and 5 on the other side. When the motor has once been started in either direction and the switch-arm then resting at its ends either on the plates $l'$ and $l^2$ or $l$ and $l^3$, none of the sections are short-circuited, and all are traversed by the main current.

Considering the machine to have been started and in full operation, it is to be understood that the revolution of the armature through the magnetic field induces an electric current in the several armature-conductors, (as in any dynamo,) and this induced current in this machine has the same phase as the alternating field magnetism and magnetizes the adjacent portions of the armature in a direction perpendicular (or at right angles) to the direction of the field magnetism, and this induced current is always proportional to the speed of the armature.

By the alternations of the field magnetism there is induced in the armature another current which lags behind the field magnetism one-quarter of a period and magnetizes the armature in the same direction as the field. This latter current is independent of the revolution of the armature and is due to so-called "mutual induction." These two currents thus circulating in the conductors of the revolving armature differ in phase by one-quarter of a period and magnetize in directions which are perpendicular to each other, and therefore they cause one or more groups or sets (according to whether used in a bipolar or multipolar machine) of rotating magnet-poles in the armature, which by their attraction and repulsion of the alternating field-poles cause rotation of the armature. The one of these currents which is due wholly to rotation of the armature cannot of course be developed when the armature is at rest, and it is only when the armature is in motion that there is any rotation of the magnet-poles in the armature, and the rotation of these poles only reaches uniform strength and speed when the armature approaches synchronism with the alternating current. For these reasons motor-starting devices must be employed, and when said devices are purely mechanical their mode of operation will be obvious; but when electrical powers are invoked in connection with a starting device the latter must be capable of setting up conditions more or less closely corresponding to the electrical conditions attending the armature when it is under full operation. It must be understood, however, that my description of the varied electrical and magnetic conditions involved in the operation of my machines is not intended to be more than a general outline, the action being somewhat more complex than I have indicated. At all events by working the switch already described, and thereby intermittingly short-circuiting portions of the field-coils, which, as shown, are unsymmetrically located with reference to the connections of the field with the main or supply wire terminals, electrical and magnetic conditions are produced in the armature which so far resemble those present while it is in motion as to cause it to commence rotation.

For causing the armature-poles to revolve with uniformity as to speed and strength the armature-conductors should be numerous, and for securing the best results the magnetic resistance of the armature should be uniform or equal in all directions—that is, the armature must not have any well-defined pole-faces corresponding in number to those of the field—and in this respect motors embodying my complete invention differ essentially from other types of alternating motors which work by repulsion of shuttle-formed armatures by an alternating field, although certain portions of my invention may be employed in connection with armatures of the shuttle type, as will be hereinafter explained.

With my novel combination of a field having a well-defined number of pole-faces and an armature having no well-defined pole-faces, but approximately equal magnetic resistance in all directions and closed-circuit conductors, and the latter being numerous and having no large common divisor with the number of field-poles, (and as a rule greater in number than the number of poles in the field,) I have secured ease and promptness in starting the motor by merely initiating its rotation by shifting or varying the electrical connections by which the field is supplied, and thereby shifting, changing, or varying the magnetic flow in the magnetic circuits in the field.

For producing the electrical and magnetic conditions in and around the stationary armature which are present when the armature is in motion, so as to cause initial rotation of the armature, I have devised and so applied to the motor-switch other means by which the terminal connections of the feeding or supply wires with the field are rotated concentrically with the armature. This organization is illustrated in Fig. 4, wherein the switch $C'$ is an intermediary between the line-wire or supply conductors $e$ and $f$, each being connected with its appropriate ring-plate $e'$ and $f'$, the two plates being concentric to each other and both being centrally located within a series of annularly-arranged contact blocks or plates, of which there are sixteen, (designated, progressively, from $e^2$ to $e^{17}$.) Two brushes $f^2$ and $f^3$ are coupled together and axially mounted at the center of the switch and provided with a hand-crank $n'$, so that they may be readily and rapidly operated in continuous successive rotations. The brush $f^2$ at one end rests upon the supply-terminal plate $f'$, and at the other end it bears upon and can sweep over all of the blocks $e^2$ to $e^{17}$. The brush $f^3$ in like manner at its outer end engages with said blocks, and at its inner end it bears upon the annular terminal plate $e'$. The motor A, its field-magnet $A'$, and armature B are as before described; but in this case the wire connections between each two of the sixteen coils $a$ are coupled to an appropriate contact-block of the switch by wires which are designated by numerals which correspond with the numeral of each block—as, for instance, by wire 2 from block $e^2$, by wire 3 from block $e^3$, and so on throughout the series. As here shown, the motor is coupled to operate as a bipolar machine, the current entering and leaving by supply-terminals which are always diametrically opposite each other—as, for instance, with the switch bars or brushes in the position shown the supply connections with the field-coils are from $e$ to $e'$, to brush $f^3$, contact-block $e^{17}$, by wire 17 to one side of the annular field, where it divides, passes in both directions to the opposite side, and thence by wire 9 to switch-block $e^9$, to brush $f^2$, and thence to the ring-plate $f'$ and out on supply-terminal $f$. It will now be obvious that when the switch-brushes are rotated the terminal connections are also rotatively shifted progressively and in regular succession, thus rotating the field, and that this action with respect to the armature and its closed-circuit conductors causes induced currents in the latter which so far resemble the induced currents therein which are caused by the rotation of the armature; that the latter will start from its position of rest and with torque corresponding to the speed at which the switch may be rotated, the armature revolving in a direction opposite to that in which the field is rotated. When the motor has been thus started, the motion of the armature thereafter produces induced currents which afford the magnetic reaction necessary for its continued rotation, and hence the rotation of the switch (or field) is no longer required. Both of these starting-switches are shown combined in the organization Fig. 5, wherein the motor A, its field $A'$, and armature B are as before described.

The sixteen field-coils $a$ are connected with this switch $c^2$ by wires 2 3 4, &c., with appropriate switch-blocks $e^2$ $e^3$ $e^4$, &c., and ring-plates $e'$ and $f'$ are connected with the terminals of supply-wires $e$ and $f$, as before described in connection with switch $C'$. In this case, however, four brushes are employed, and these are carried on a suitable carrier $n^4$, axially mounted and having a hand-crank $n'$. Of these four brushes those at $n^2$ and $n^3$ are for short-circuiting, while the brushes $f^5$ and $f^6$, respectively, couple the supply ring-plates $f'$ and $e'$ with the several blocks $e^2$ $e^3$, &c., and thereby revolve the field-terminals. With the brushes standing in the position shown (or as they should be when at rest) the current enters through main supply-wire $e$ to ring $e'$ and by way of the brush $f^6$ passes to block $e^9$, thence by wire 9 to the field, where it divides, passing in both directions around to the opposite side of the field and emerges at the terminal of wire 17, thence to block $e^{17}$ and brush $f^5$, to ring $f'$, and out on supply-wire $f$. When the brushes $n^2$ and $n^3$ overlap any two contact-blocks, they short-circuit the sections which in each instance unsymmetrically intervene between the corresponding four coil-terminals. This starting-switch is organized for coöperating with a non-reversible motor.

As thus far described my motors and their starting-switches have been of the bipolar type; but the application of this portion of my invention to a multipolar organization is shown in Fig. 6, wherein an eight-pole motor-field $A^2$ and armature B, with a reversible starting-switch $C^3$, are shown, with the several appropriate electric connections. In this motor-field there are sixteen cores or polar projections, respectively designated by numerals 1 to 16, and each having its appropriate field-coil or coil-section $a$ designated. The coil connections are grouped in fours joined in series and in closed circuit, as in multipolar Gramme machines. In other words, coils $a$ at 1, 5, 9, and 13 are in one connected group, those at 14, 2, 6, and 10 in another, and so on throughout the sixteen coils. At the one side of the machine four of the outside connections between appropriate coils are graphically displayed in Fig. 6 at one side at $p'$, $q'$, $r'$, and $s'$, these being terminal wires of the four groups of coils. The starting-switch $C^3$ has interior circular contact-plates $e'$ and $f'$, to which the supply-wire terminals $e$ and $f$ are connected. In an outer concentric circle there are forty-eight contact-blocks. A switch-arm $n^5$ is provided with a hand-crank $n'$ and carries two brushes $f^5$ and $f^6$, which are separated by a space a little greater than the length of a contact-block, (on the circular line,) and they respectively connect the several blocks with the supply-terminal contact-plates $f'$ and $e'$. The contact-blocks are connected in fours— $p$ with $p$, $q$ with $q$, $r$ with $r$, and $s$ with $s$— throughout the series by means of outside annular and radial conductors $p^2$, $q^2$, $r^2$, and $s^2$, and each of said annular conductors is connected by a wire with its appropriate set of coils, as follows: The several contact-blocks $p$ connect with the radial and annular conductor $p^2$, and this in turn connects with the connecting-wire $p^3$, which couples with the terminals of appropriate coils, and so, also, do the blocks $q$, $r$, and $s$, the arrangement being such that when excited each two adjacent coils are similarly magnetized—as, for instance, at coils 1 2 and 5 6 and 9 10 and 13 14 there will be an N polarity and at the intervening pairs an S polarity. Now by rotating this switch-bar in one direction when the armature is at rest there will result a reversing first of one half and then of the other half of the coils in alternation as will cause such a rotation of the field-terminals as will start the motor in one direction, while for effecting a reversal of the motor the switch has only to be revolved in an opposite direction. While the motor is at full speed it may be checked or even stopped if the starting-switch should be rotated at sufficiently high speed.

It will be readily seen that my starting-switches need not always be of an annular form, it being obvious that any one of the switches shown may be so adapted that its brush or brushes may slide and operate in a straight line, the contact-blocks being then arranged in one or more parallel rows and appropriately connected with the field-coils. This straight-line arrangement is well adapted to the simple form of hand starting-switch C; but in those switches which require rapid, continuous, and repeatedly-successive contact of the brushes the annular arrangement seems to be preferable.

As thus far described the starting-switches have been connected with coils to which the main exciting-current is supplied; but it is to be understood that this portion of my invention is not restricted to the combination of a starting-switch with field-coils which are traversed by the main current, inasmuch as separate coils in which current is induced from the field may be employed with sole reference to the performance of motor-starting duty when properly controlled by means of an appropriate motor-starting switch. It will be observed in connection with my method of electrically starting alternating-current motors having closed-circuit armatures and multipolar fields that separate portions of the field are alternately and variably controlled. The valuable results of this mode of operation led to my devising a novel method of operating and controlling multipolar dynamos, which, broadly stated, consists in a peculiar and novel method of varying the polar organization, which can be done while the machine is at rest or in operation—as, for instance, any machine adapted to operate as a sixteen, eight, or four pole machine may be capable of performing its normal duty when operated as an eight-pole machine; but it may also be successfully operated as a four-pole machine at double speed if more duty is required than normal, or if lesser duty be required it may then be operated slowly as a sixteen-pole machine. Such machines can be controlled by hand or by a mechanical regulator, which, according to variations in speed, due to variations in load, will be capable of changing the machine from its eight-polar condition to a four-pole or to a sixteen-pole machine and back again to either of its other conditions. It is in connection with an organization of this type that I have illustrated the independent starting-coils, hereinbefore referred to. (See Figs. 7, 8, and 9.)

In Fig. 7 only the field with its magnetic metal, its coils $a$, and the governing pole-switch D are shown. The annular field metal at $A^3$ is composed of plates of soft iron, and it is internally recessed to afford sixteen polar projections, (respectively numbered from 1 to 16,) and each is surrounded by its appropriate field-coil $a$. Each polar projection is perforated near its end from side to side of the field, as specially shown in Fig. 9, at $t$ for the reception of the sides of two sets of starting-coils $t'$ and $t^2$. Only one set of these coils is shown in Fig. 7, this being sufficient for starting the motor in one direction, the double arrangement being required for reversible motors. The several coils $t'$, as shown in Fig. 7, are connected in series in a circuit having its terminals $t^3$ $t^4$ connected with two switch-plates $l$ and $m$ of the starting-switch $C^4$, which resembles the switch C, already described, in the zigzag construction and arrangement of its contact-plates, which are swept by a brush on a pivoted arm, as in said other switch, so that as the brush is swung from the one side to the other the starting-coil circuit is repeatedly closed and opened, there being several separating-lines between the plates in the path of the brush. A reversible starting-switch for use with the two sets of starting-coils $t'$ and $t^2$ will only involve the duplication of the plates $l$ and $m$ and their location within the path of the brush and suitably enlarged and appropriate connections with the second set of starting-coils.

The several magnet-coils are divided into four separate circuits. The terminal of the coil at magnet 1 is connected with one feeding or line wire $e$, and the terminal of the coil of the magnet 10 connects with an outside pole-switch conductor $u'$. Similar switching-conductors $u^2$, $u^3$, $u^4$, $u^5$, $u^6$, and $u^7$ are in like manner respectively connected with one of the terminals of coils at magnets 11, 12, 13, 14, 15, and 16. Now, tracing the circuit through from each of these outside connections, it will be seen that the current from the supply-wire $e$ has a direct circuit in the coils $a$ at 1 and 2 and thence by an outside crosswise conductor or wire $v$ to coils at 9 and 10 to and out on pole-switch conductor $u'$. Coils at 16, 3, 8, and 11 are coupled with each other by crosswise conductors $v'$, $v^2$, and $v^3$ and to the switch-conductors $u^2$ and $u^7$. The coils at 15, 4, 7, and 12 are connected by wires at $v^4$ $v^5$ $v^6$ and with the switch-conductors $u^3$ and $u^6$. The coils at 14, 5, 6, and 13 are connected with each other by wires $v^7$, $v^8$, and $v^9$ and with the pole-switch conductors $u^4$ and $u^5$.

The pole-switch D is shown in plane projection in Fig. 7 and also in end view in Fig. 8. Eight brushes E, F, G, H, I, K, L, and M are employed. The brush E is connected with the terminal $f$ of the supply-wire. The brush F by way of wire $u^3$ is coupled to the field-section which includes magnets 12, 7, 4, and 15, the outside wire $u^6$ connecting with brush G. The brush H connects by wire $u^7$ with magnets 16, 3, 8, and 11, their other outside wire $u^2$ connecting with brush I. The brush K connects by wire $u^5$ with magnets 14, 5, 6, and 13 and thence with outside wire $u^4$, which is connected with brush L. The brush M by wire $u'$ takes in magnets 10, 9, 2, and I, their other terminal being the supply-wire $e$. The cylindrical surface of the switch is provided with eleven contact-plates insulated from each other, although some of them are interconnected. Longitudinal with the cylinder there is an insulating-space at $u$, on which all of the brushes bear when the machine is at rest, all of the coils being then cut out, the brushes occupying said position in Fig. 7. At one end of the cylinder there is a contact-plate E', wide enough—i. e., lengthwise of the cylinder—to accommodate two brushes E and F; but it is centrally recessed at one side for the reception of a plate F', which lies in the path of the brush F. Next there is a contact-plate G', wide enough to afford bearings for two brushes G and H; but it is shorter than the plate E' to accommodate two other plates $G^2$ and H' side by side and respectively in the paths of the brushes G and H. Next is a short contact-plate I', wide enough for two brushes I and K, and in their paths are two small plates $I^2$ and K' and also beyond them another wide plate $I^3$, which is common to both brushes. Next, and finally, there is a large plate L', corresponding in length with the plate E' and mainly of uniform width for contact with brushes L and M; but at its rear inner end at one side it is recessed to accommodate a plate $L^2$ in the path of the brush L. The interconnections of these plates are as follows: Plates E' and $I^2$ are connected by subwire $u^8$, plates F' and K' are similarly coupled by wire $u^9$, plates $G^2$ and $L^2$ are coupled by wire $u^{10}$, and plates H' and L' are coupled by wire $u^{11}$. Upon the face of the switch, as here shown, there are three longitudinal dotted lines for indicating the three positions of the switch which are required for operating the motor, as a sixteen-pole or as an eight-pole or as a four-pole machine. With the brushes occupying the line $x$ it will be seen that the circuit from line-wire $e$ to line-wire $f$ will be as follows: from $e$, through magnets 1, 2, 9, and 10, out on $u'$ to brush M and switch-plate L', thence by brush L and wire $u^4$ to magnets 13, 6, 5, and 14, out on wire $u^5$ to brush K to plate I', thence by brush I and wire $u^2$ through magnets 11, 8, 3, and 16, out on wire $u^7$ to brush H and plate G', thence by brush G, out on wire $u^6$, through magnets 15, 4, 7, and 12, out on wire $u^3$ to brush F and plate E', from which the circuit by way of brush E is completed to the other supply-wire $f$, and thus appropriately exciting all of the coils in the several magnets, the magnets of one polarity, 1 3 5, &c., being separated by magnets 2 4 6, &c., of opposite polarity. The machine then operates, therefore, at slow speed as a sixteen-pole machine, the four circuits of magnet-coils being connected in series. If now the switch-cylinder be so rotated that the brushes will rest on line $y$, the circuit will be as follows: from $e$, through magnets 1, 2, 9, and 10, out on wire $u'$ to brush M and plate L', thence by brush L and wire $u^4$ through magnets 13, 6, 5, and 14, out on wire $u^5$ to brush K, which, resting on plate $k'$, finds a direct path by way of subwire $u^9$ to plate F', to brush F, and on wire $u^3$, to and through magnets 12, 7, 4, and 15, out on $u^6$ to brush G and plate G', to brush H, and thence on wire $u^7$, to and through magnets 16, 3, 8, and 11, out on wire $u^2$ to brush I, then resting on plate I$^2$, which has a direct subconnection by wire $u^8$ with the plate E', and thence out by brush E to the other terminal wire $f$. By this change each two adjacent magnets have been made of corresponding polarity, and hence the machine operates at double speed as an eight-pole machine. The circuits by way of wires $u^2$ $u^7$ and $u^3$ $u^6$ having been reversed, the polarity of their connected magnets are correspondingly reversed. If next the switch be turned so that the brushes will rest on the line $z$, the magnets will in polarity be so grouped in fours as to enable the machine to operate twice as fast as before as a four-pole machine, the circuit then being, say, from $e$, through coils 1, 2, 9, and 10, out on $u'$ to brush M and plate L', thence by subwire $u^{11}$ to plate H', thence by brush H and wire $u^7$ to and through magnets 16, 3, 8, and 11, out on wire $u^2$ to brush I, to plate I$^3$, thence by brush K and wire $u^5$ through magnets 14, 5, 6, and 13, out on $u^4$ to brush L and plate L$^2$, which by subwire $u^{10}$ connects with plate G$^2$, from which by way of brush G and wire $u^6$ the circuit lies through magnets 15, 4, 7, and 12, out on wire $u^3$ to brush F and plate E', and thence by brush E to the other supply-terminal $f$. In this case the magnet-coils included by the terminals $u^3$ $u^6$ and $u^4$ $u^5$ will have been again reversed.

It will be obvious that by means of suitable variations in the pole-switch wide ranges of variation can be effected in any machine regardless of its number of magnets and to thereby provide for fine and accurate regulating adjustments for varying speed and for securing desirable uniformity therein under varying loads.

Having thus shown and described an organization in which regulation of speed is effected by variations as to polarity in groups of magnets in a multipolar machine specially devised for use with alternating currents, it is to be understood that I believe it to be broadly new to control any multipolar motor having a closed-circuit armature by reversing the current in one or more portions of the magnet-coils, so as to cause it to operate at will or under the control of a mechanical governor either as a machine in which all of the several pole-faces alternate in polarity or with the magnets coupled as to polarity side by side to any desired extent or in any desired division of the whole number of magnets. This system of controlling the polar conditions of alternating-current motors having closed-circuit armatures can obviously be applied to a field having coils wound as shown in Figs. 1 and 2, the particular forms of cores and coils shown in Fig. 7 having been selected because of the facility afforded thereby for graphic illustration. Motors of this type operated by alternating currents can be relied upon for highly effective and comparatively heavy service, and they can be controlled and regulated not only by way of a pole-switch, as described, but also by means of starting-switches, when organized as by me, to operate also as motor-governing devices, and an organization of this type is illustrated in Figs. 10 and 11. Referring first to Fig. 10, it is to be understood that the motor A$^4$ is a reversible motor, having in its field thirty-two polar projections provided with magnet-coils so coupled and arranged as to produce a four-pole machine. The armature is constructed as already described and has numerous copper plugs in the iron core and copper head, so as to afford thirty-nine closed circuits. Upon the armature-shaft N there is a fixed bushing or sleeve N', one end of which serves as a journal-box lining, the remainder being internally cut away to reduce bearing contact with the shaft. On this sleeve a rotative hub N$^2$ is mounted, and this near one end is appropriately grooved for the reception of one turn of a hand-rope N$^3$, such as is used with elevators, and is usually accessible at or near the car. The opposite or outer end of the hub N$^2$ serves as the support for an annular series of contact or switch plates which constitute a part of the starting-switch C$^5$, the brushes $f^2$ and $f^3$ of which are carried on a separate hub N$^4$, adapted to slide on the armature-shaft, and also rotatively coupled thereto by means of the ball-governor N$^5$, this latter having its balls held normally by a spring which is adjustable as to tension and the brushes $f^2$ and $f^3$ being normally engaged with the contact-plates; but should undue speed spread the balls said brushes would be lifted from said plates and the contact broken. In Fig. 11 this switch C$^5$ is shown in plan view, and it differs from the switch C', already described, only in having its brushes arranged for a four-pole machine instead of a bipolar. The brushes $f^2$ and $f^3$, as in said switch C', connect appropriate interior supply-rings $e'$ and $f'$ with the several contact-blocks. These contact-blocks are appropriately connected electrically with eight of a series of ten ring-conductors, as at O, (designated 1 2 3 4, &c.,) insulated from each other and carried side by side on the hub $N^2$, as clearly shown in Fig. 10, and reduced to a plane projection in Fig. 11. Each of the ring-conductors has a contact-brush, as at O', and two of these, at 9 and 10, are connected with branch or shunt conductors from the supply or line wires $e$ and $f$. The other brushes of the group O' are coupled with the field of a governing-motor A A by way of wires 1 to 8, inclusive, after the manner shown and described in connection with switch C', Fig. 4. This governing-motor A A, Figs. 10 and 11, is a small machine of the type already described, and it is the driver of the power starting-switch $C^6$, the armature-shaft $N^6$ carrying the arms of the brushes $f^2$ and $f^3$. This motor A A mechanically operates the power-switch $C^6$ after and as the result of starting the motor A A by means of the hand starting-switch $C^5$, which is actuated by way of the hand-rope $N^3$. The brushes $f^2$ and $f^3$ of the hand starting-switch $C^5$, with the sixteen contact-blocks therein, are substantially as before described, although these blocks are connected in diametric pairs by eight outside conductors, (appropriately designated by numerals 1 to 8, inclusive,) as shown in Fig. 10. In said Fig. 11 the governing-motor A A is also shown with its eight electric connections to and with the hand starting-switch $C^5$, they being also designated by numerals. The brushes $f^2 f^3$ of said switch $C^5$ are at right angles to each other, so that their outer ends may rest on blocks, which are separated by three blocks, as is appropriate for a four-pole starting-switch. The rings 9 and 10 of this switch $C^5$ are coupled, respectively, to the inside supply-rings $e'$ and $f'$ by wires at $e$ and $f$, which afford a shunt-circuit from the main wires, which are similarly designated. The power-switch $C^6$ has thirty-two contact-blocks, and each two diametrically opposite blocks are coupled by outside connections, of which there are sixteen, appropriately designated by numerals, and it has inside rings $e'$ and $f'$, which are connected with the supply or line wire terminals $e$ and $f$. The brushes $f^2$ and $f^3$ of this switch are also at right angles to each other, and hence their outer ends are always a little more than seven contact-blocks apart. The sixteen outside conductors of the switch $C^6$, as shown in Fig. 10, are respectively coupled with sixteen other outside conductors, (designated 1 to 16,) which are connected with the united terminals of the magnet-coils of the power-motor $A^4$ at diametrically opposite points, said coils being in series, as before described, and properly organized for a four-pole machine. The supply-current to the conductors $e$ and $f$ is afforded from the transformer P, and a cut-out switch P' has been organized by me so as to be operated by way of the hand-rope in connection with a mechanical brake, these parts not being here shown, as they need not differ from the corresponding portion of my electric-elevator organization fully disclosed in my Letters Patent No. 454,462, June 23, 1891.

The operation of the organization thus illustrated is as follows: All the parts being at rest, the hand-rope $N^3$ is manipulated in the usual manner, causing the contact-blocks of the hand starting-switch $C^5$ to be sufficiently rotated for causing the initial rotation of the armature of the governing-motor A A, which promptly reaches speed and operates the power starting-switch $C^6$, which in turn causes initial rotation of the armature of the power-motor $A^4$ under full load, and its speed promptly rises sufficiently for the performance of its duty. The power-motor $A^4$ in starting rotates the brushes of the hand starting-switch $C^5$ in such a direction as decreases the speed of the power switch-motor A A in proportion as the power-motor $A^4$ gains in headway until the speed of rotation of the field-terminals of the power-motor $A^4$, added to the speed of rotation by its armature, is slightly below its synchronous speed at which its maximum torque capacity is afforded. During the approach of the power-motor $A^4$ to synchronous speed the switch-motor A A nearly subsides and the ball-governor then operating lifts the brushes of the hand starting-switch $C^5$ and stops the switch-motor. Should, however, the power-motor be slowed down, as when overloaded, the ball-governor $N^5$ will restore the brushes of the switch $C^5$ to their operative position, and thereby start the switch-motor A A for revolving the brushes of the power starting-switch $C^6$, and this by rotating the terminals of the field-coils in the power-motor in an appropriate direction restores the torque of the power-motor to its maximum.

When small machines are required for light continuous duty, my starting-switches will seldom be warranted—as, for instance, with fan-motors, which may be readily started by convenient manipulation of the fan or by means of some form of mechanical starter, one of which is illustrated in connection with the fan-motor shown in Figs. 12 to 16, inclusive. This machine is very simple in its construction, its frame R being composed of two side plates, preferably of non-magnetic material, as zinc or brass, between which the field A' is clamped, and having two bracket-plates, one at each side, which afford bearings for the armature-shaft, which projects at both ends for respectively carrying the fan S and a grooved pulley S'. The field metal, as before described, is composed of soft laminated iron, so cut as to afford eight pole projections, and the coils $a$ are mounted thereon and connected in series, as shown in Fig. 16, the supply-circuit being broken at a pair of segmental switch-plates T T'. (Shown in Figs. 16, 14, and 12.) A pivoted switch-arm $w$, pivoted at its foot to the frame, has two brushes $w'$ $w^2$, provided with carbon contacts which when the machine is at rest bear on the insulating-block $w^3$ at one end of the segmental contact-plates T T', as shown in Fig. 12; but when swung to the one side the brushes pass to the contact-plates and close the circuit. This brush-arm serves also as the base or prolongation of a hand-lever U, which has a lateral segmental arm U', and near said arm it is pivoted to the top of the brush-arm $w$, so that said lever can vibrate slightly independently of the brush-arm for securing during its movement in one direction a good frictional rolling contact between the upper V-shaped edge of the arm U' and the under side of the grooved pulley S'. This combination of a mechanical starter with a circuit-switch is believed to be new, and it constitutes a portion of my invention. The said starter differs from other mechanical starting devices of motors in so far as it is not intended nor even able to bring the motor speed up to or near synchronism, but merely serves to initiate the rotation.

By providing the brushes of a hand starting-switch with a balance-wheel and a grooved pulley a hand-lever U may be employed therewith with or without these contact plates and brushes, the brush-arm $w$ serving as a part of the hand-lever in either case.

It is to be understood that the brushes of the rotary starting-switches may be stationary and the contact-blocks rotative or movable, that being, in fact, the mode of operation involved in organizations like that shown in Fig. 10, when the hand starting-switch is operated by way of a hand-rope. So, also, in motor-driven starting-switches, as also shown in said figure, the brushes may be stationary and the contact-blocks carried on a disk mounted on the armature-shaft of the governing-motor, in which case the disk would be provided with a hub and ring-conductors appropriately connected with the contact-blocks and provided with brushes after the manner of those at the hand starting-switch in said Fig. 10.

Now referring to the organization illustrated in Fig. 4 it is to be understood, as hereinbefore indicated, that the starting-switch there shown is not restricted to the starting of machines having armatures or induced elements which are of uniform magnetic resistance in all directions, because it is equally effective in coöperating with machines in which the armature has magnetic and electric circuits which are well defined and correspond in number to the number of field or inducing poles—as, for instance, as illustrated in Figs. 17, 18, and 19. In this motor $A^5$, the field A', its coils $a$, and the starting-switch C', with their several electric connections 1 2 3, &c., are precisely as in Fig. 4. This armature $B^4$ is, however, of the bipolar shuttle type, its two arms being provided with appropriately-wound closed-circuited coils or conductors $k^5$.

If instead of the bipolar armature the four-pole armature $B^5$ of Fig. 18 should be employed in the same field, correspondingly satisfactory results will accrue, this armature having four arms, each having appropriately-wound closed-circuited conductors $k^5$. A specially desirable multipolar armature $B^6$ of this general type is shown in Fig. 19, wherein the closed-circuit conductors $k^5$ are wound within holes which are lengthwise in the armature-core and are cut through at the periphery thereof, as clearly indicated.

Machines embodying armatures of this kind, but otherwise corresponding with those already described, may be promptly started under load by means of their terminal rotating starting-switch.

That portion of my invention herein disclosed which relates to a novel armature construction as well as that portion which relates to a novel arrangement of the armature-conductors with reference to the poles of the field-magnet are not claimed in this application, since these features of invention are included in the subject-matter of a division of this application, Serial No. 44,576, filed January 24, 1901.

I do not claim in this application the novel method of operating alternating-current electric motors disclosed herein, since this method constitutes the subject-matter of a divisional application, Serial No. 107,146, filed May 13, 1902.

Having thus described my invention, I claim as new and desire to secure by Letters Patent—

1. In an alternating-current motor, the combination substantially as hereinbefore described, of an armature having an iron core, and affording electric circuits closed upon themselves, a field consisting of magnetic metal and coils continuously wound in closed electric circuit, and connected with the alternating main or supply circuit, and means substantially as described, which start the motor by intermittingly short-circuiting parts or sections of the field-coils which are unsymmetrically located with reference to the connections of the coils with the supply-wire terminals, and leave said coils free from short-circuit, after the initial rotation of the motor-armature has been accomplished, and self-rotation assured.

2. The combination substantially as hereinbefore described, with an alternating-current motor, having field-coils, to which working current is supplied, and an armature having an iron core and provided with closed circuits only traversed by electric currents induced by its own rotation and by the alternations of the motor-field, of a starting-switch, adapted to shift, change, or vary the flow of magnetism in the magnetic circuits in the field, and to thereby set up in the armature correspondingly shifted, changed, or varied magnetic circuits, and to thereby cause it to initially rotate, the said switch, the armature, and the field, being further adapted to cause the armature to continue its rotation while the switch is at rest.

3. The combination substantially as hereinbefore described, of an alternating-current motor, and a motor-starting switch, having contact-blocks connected consecutively with a corresponding number of the terminals of the field-coils of the motor, and also having a brush, or movable contact arranged to sweep rapidly over said contact-blocks, and to thereby so shift, change, or vary the flow of magnetism in the magnetic circuits in the field, as to cause initial rotation of the motor-armature and thereafter, with the switch at rest, to enable the armature to continue its rotation.

4. The combination substantially as hereinbefore described, of an alternating-current motor, and a motor-starting switch having a series of contact-blocks connected consecutively with the terminals of the motor field-coil sections, and also having other contact-blocks connected respectively with two supply-wire terminals; and still further, having brushes or sliding contacts arranged to sweep over all of said contact-blocks, and to thereby progressively connect the supply-terminals with appropriate field-coil terminals, and progressively cut out and restore certain of the field-coil sections, in passing from one block to the other in the series, and to thereby so shift, change, and vary the flow of magnetism in the magnetic circuits in the field, as to cause initial rotation of the motor-armature.

5. The combination substantially as hereinbefore described, of an alternating-current motor, and a motor-starting switch, having a series of contact-blocks, consecutively connected with terminals of the field-coil sections; also having other contact-blocks connected with supply-wire terminals, and still further having two pairs of brushes, or movable contacts, one pair serving to progressively connect appropriate field-coils with the supply-wire terminals, and the other pair of brushes, serving to intermittingly short-circuit sections or portions of the field-coil which are unsymmetrically located, with reference to the points at which the field-coils are, for the time being, connected with the supply-terminals, said switch being adapted to so change, shift, or vary the flow of magnetism in the magnetic circuits in the motor-field, as to cause initial rotation of the motor-armature in the desired direction.

6. The combination substantially as hereinbefore described, of an alternating-current motor having its field-coils in circuit with supply-wires, and also an armature disconnected from the supply-circuit, and adapted to operate synchronously with the alternations in the supply-circuit of a rotative starting-switch, which shifts, changes, or varies the flow of magnetism in the magnetic circuits in the field, and thereby causes initial rotation of the armature, and increases the speed of the armature in inverse proportion to the increased speed at which the switch is or may be rotated, said switch then ceasing its control of the field-circuits, and permitting the coöperation of the field and armature to continue and maintain the rotation of the armature.

7. The combination substantially as hereinbefore described, of an alternating-current motor from which duty-power is to be imparted; a rotative motor-starting switch coupled to the field-coil sections of the power-motor; a second or governing alternating-current motor, attached to, and operating the said motor-starting switch, coupled to the field-coil sections of the governing-motor, for causing its armature to initially rotate; the organization of said combination being such, that the working of the hand starting-switch, will set the governing-motor in operation, and the latter, will then rapidly operate the motor-starting switch, and cause the power-motor to commence its initial rotation under normal load, and to increase its rotation, until maximum speed has been reached.

8. The combination substantially as hereinbefore described, of an alternating-current motor adapted to service as a power-motor; a motor-starting switch connected with the field-coils of the power-motor, and adapted to shift, change, or vary the flow of magnetism in the magnetic circuits in the motor-field, and to thereby cause the power-motor to initially operate; an alternating-current-governing motor, for operating the motor-starting switch, for inducing initial action of the power-motor under normal load; a hand starting-switch connected with the governing-motor for causing its initial movement; and a mechanical governor, driven by the power-motor, for controlling the hand starting-switch, and through that, the governing-motor, and by way of the latter, controlling the speed of the power-motor.

9. The combination substantially as hereinbefore described, of an alternating-current motor, a rotative starting-switch adapted to shift, change, or vary the flow of magnetism in the magnetic circuits in the motor-field, and a mechanical governor driven by the motor, connected to the starting-switch, and rendering the latter inactive during the operation of the motor under an appropriate load.

10. The combination with the field-coils of a multipolar alternating-current motor, having a closed-circuit armature and a starting-switch, of a current-switch having half as many brushes as there are field-coils, and a set of united switch-plates, coöperating with said brushes; subelectric connections which directly couple certain of said switch-plates, and similar connections which directly couple certain of said field-coils, the switching organization being such, that a movement of the switch in one direction, will at each change, reduce the number of field-pole divisions one-half, and when moved in the opposite direction will at each change, double the number of polar divisions substantially as described.

11. The combination with a source of alternating or similar currents, of an electric motor having a set of field-coils, a starting-switch for varying at will the position of the magnetic field at starting, and an armature short-circuited or otherwise connected to react and continue the rotary effect, substantially as described.

12. In combination in an electric motor, a set of field-producing coils, a source of alternating or similar currents, a current-distributer therefor for varying at will the position of the magnetic field at starting, and an armature, short-circuited or otherwise, connected to react and continue the rotary effect.

13. The combination with an alternating-current motor having its field-coils supplied with current from an alternating-current-supply circuit and its armature disconnected from said supply-circuit, of means for shifting, changing or varying the flow of magnetism in the magnetic circuits of the field and thereby causing rotation of the armature.

RUDOLF EICKEMEYER.

Witnesses:
JAMES S. FITCH,
O. B. WARING.